United States Patent [19]
Mettler

[11] 3,835,946
[45] Sept. 17, 1974

[54] PLATFORM SCALE
[75] Inventor: Erhard Mettler, Zollikon, Switzerland
[73] Assignee: Mettler Instruments AG, Greifensee, Switzerland
[22] Filed: Sept. 4, 1973
[21] Appl. No.: 394,085

[30] Foreign Application Priority Data
Sept. 29, 1972  Switzerland........................ 14290/72

[52] U.S. Cl. ............................................. 177/256
[51] Int. Cl. ........................................... G01q 21/08
[58] Field of Search............ 177/210, 211, 256–259

[56] References Cited
UNITED STATES PATENTS
2,766,981   10/1956   Lauler et al. ........................ 177/211
FOREIGN PATENTS OR APPLICATIONS
12,937   8/1880   Germany............................ 177/258

*Primary Examiner*—George H. Miller, Jr.
*Attorney, Agent, or Firm*—Lawrence E. Laubscher

[57]  ABSTRACT

Weighing apparatus of the platform scale type, characterized by the provision of load lever means including a pair of parallel load levers of unequal lengths for transmitting the vertical movement of the platform to weighing means mounted on one side thereof. Each load lever is connected at a first end with the frame of the apparatus, the other ends of the levers being connected with the weighing means. The load force of the platform is applied to an intermediate point on each of the levers adjacent their first ends, the ratio of the distance between said intermediate point and said first lever end to the distance between the intermediate point and the other lever end being the same for each lever. Preferably the said other ends of the load levers are connected with the weighing means by means including a pair of knife edges having a common horizontal line normal to the lever axes, the first ends of the levers extending under the platform means.

9 Claims, 3 Drawing Figures

PLATFORM SCALE

This invention relates to weighing apparatus of the platform scale type.

Various types of platform scale weighing apparatuses have been proposed which include a platform supported by two load levers, and a weighing means arranged outside the region of the platform. The force applied to the platform by the load being weighed is transmitted to the weighing means by way of intermediate levers. The load levers in this kind of platform scale are always of equal length and are usually arranged symmetrically. The precisely equal length of the load levers is of prime importance in order to achieve equal pivotal movements of the load levers during the operation, thereby to prevent jamming of the components. Even in the case of balances in which the movement of the moved members is small, this arrangement with equal-length load levers has hitherto been retained (see for example Reimpell-Bachmann, Handbuch des Waagenbaus, 1966, page 102).

One disadvantage of this lever arrangement is that the lengths of the load levers depend on the dimension of the platform, and consequently the precision of the balance is correspondingly limited.

According to the present invention, there is provided a platform scale comprising a bridge, two load levers of unequal lengths supporting the platform, the lever arms of said two load levers having the same force-transmission ratio, weighing means arranged outside the region of the platform, said weighing means including a force transducer which has a small operating travel, and common connecting means connecting the two load levers with the transducer.

Embodiments of a platform scale according to the present invention will now be described by way of example with reference to the following specification when viewed in the light of the accompanying drawing, in which.

The balances described hereinafter are both balances with electromagnetic force compensation of the type disclosed, for example, in the Strobel U.S. Pat. No. 3,688,854.

Figure 1:
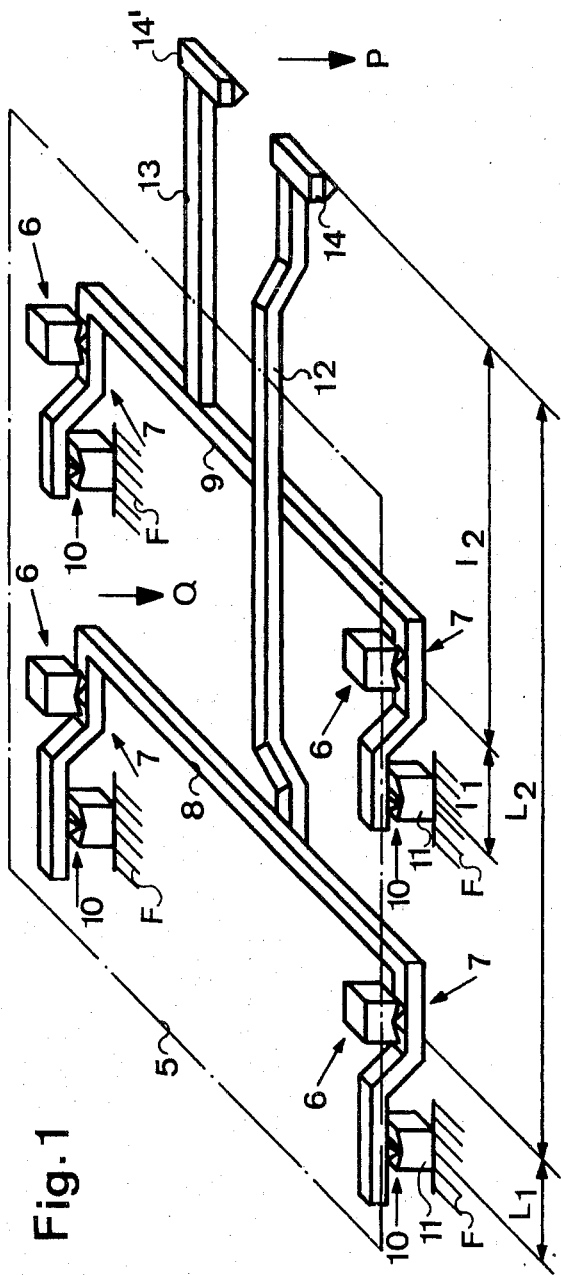
FIG. 1 is a perspective view of the lever mechanism of the balance.
Figure 2:
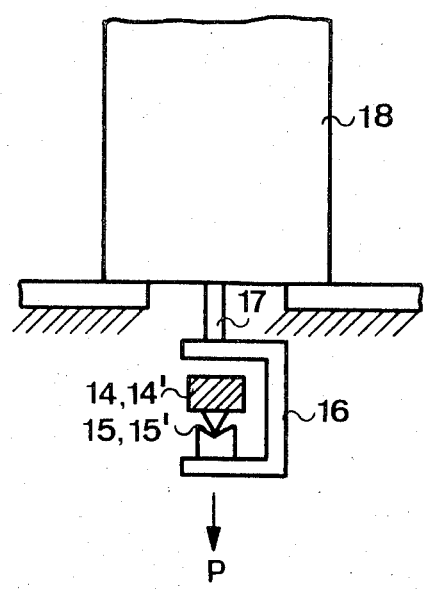
FIG. 2 illustrates the connection of the lever mechanism of FIG. 1 to a force transducer.

Referring first more particularly to FIGS. 1 and 2, the platform scale comprises a platform 5 (for the sake of simplicity shown in FIG. 1 only in dash-dotted lines) supported on four supports 6. The supports 6 have on their downwardly facing surfaces V-shaped sockets which, with four knife edges, form bearing points 7. The knife edges are mounted on the top side of two load levers 8 and 9. Each of the two load levers 8 and 9 is supported by way of two knife-edge bearings 10 on supports 11 which are fixedly connected to the base structure of the balance frame F.

A relatively long cantilever arm 12 is fixedly connected at a first end with the lever 8 and comprises a plurality of portions which lie at angles to each other so that the arm 12 is raised in the central part of its length so as to extend over the load lever 9. At its free other end the cantilever arm 12 carries a knife-edge carrier 14.

In a similar manner, a relatively short cantilever arm 13 is fixedly connected at a first end with the load lever 9, while at its free other end the arm 13 carries a knife-edge carrier 14'. The extremities of the two knife edges on the carriers 14 and 14' lie on a straight line normal to the axes of the load levers, as is clearly visible in FIG. 1.

As shown in FIG. 2, the two knife-edge carriers 14 and 14' rest in a two-part V-shaped bearing socket 15 and 15' of a connecting member 16. The bearing socket 15 and 15' is preferably selfadjusting. The connecting member 16 acts as a suspension member and, by way of a tension element 17, is connected with the movable part of a force transducer 18 which is only diagrammatically illustrated. It will be understood that the operating travel of the movable part of the transducer 18 is very small, down to virtually nil. A mechanical-electrical transducer is preferably used, although other constructions, for example, a hydraulic force converter, are also possible. The transducer 18 is fixedly mounted in the housing of the balance and in this embodiment is in the form of an electromagnetically operating compensation pot means, as is described in greater detail in the Swiss Pat. No. 529,998, with the single difference that in that case the load being weighed acts directly and downwardly on the compensation pot means, whereas in the embodiment described herein, the load applies a stepped-down pulling force at the lower end. The details of the computing and display means of the balance will not be included here, as they are without importance for the present invention.

The distances between the various bearing points of the lever mechanism are so selected that the relationships $l_1/l_2$ and $L_1/L_2$ are precisely 1:9; this gives a step-down transmission from the platform 5 to the transducer 18 of 10:1. Consequently, with a platform load capacity of $Q = 15$ kg, a maximum force of 1.5 kg acts on the transducer 18. The above-described balance operates on 30 mg precisely, and therefore gives a degree of resolution of $5 \cdot 10^5$. This performance is possible, in spite of the interconnected load levers 8 and 9 being of different lengths, because the deflection of the movable part of the transducer 18 under load, transmitted by the element 17, is only of the order of thousandths of a millimeter.

Figure 3:
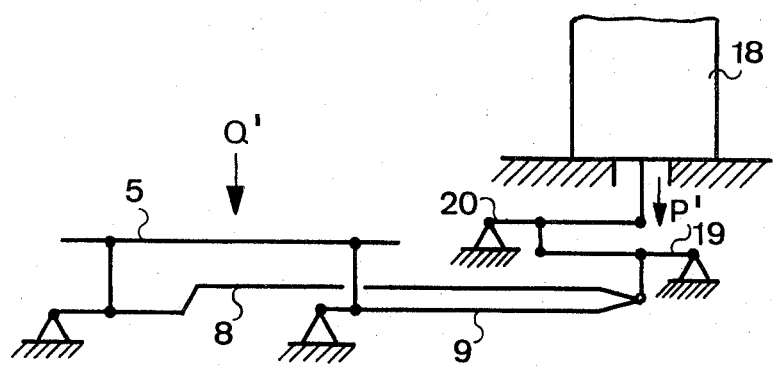
FIG. 3 is a diagrammatic view of an alternative embodiment of the bridge balance.

FIG. 3 illustrates a modified embodiment of the above-described lever mechanism arrangement, in a diagrammatic side view. Basically the FIG. 3 embodiment differs from that of FIGS. 1 and 2 only by the inclusion of two transmission levers 19 and 20 for producing an increased weighing capacity, by providing a substantial reduction in the transmission of load from the platform 5 (weight Q') to the transducer 18. In this embodiment also the essential criterion is the virtually travel-free transmission of the load Q' being weighed from the platform 5 to the transducer 18, using load levers 8 and 9 of unequal lengths.

As the knife-edge bearings used in the above-described embodiments are not employed to permit a pivotal movement, in principle any other suitable connecting means between platform and load levers or load levers and base plate can be used. The nature of the connecting means depends, in addition to the direction of the forces to be carried, only on the precision requirements of the lever transmission.

In the illustrated embodiment, the cantilever arms 12 and 13 are illustrated as terminating in horizontal generally coplanar side-by-side relation. In the alternative, these portions may be arranged behind or above one another.

It will be apparent that the above-described balances can make use of any form of force transducer whose operating travel is very small, down to virtually nil, as is conventionally used currently in the art (for example, in the form of load cells arranged below track weighing machines). The use of substantially travelless systems of this kind means inter alia that, in the weighing operation, the individual components of the lever mechanism are subject to virtually no pivotal movement. There is therefore no need for the load levers to be of equal lengths, as the danger of jamming of the components is positively alleviated.

The above-described balances also enjoy the following advantages:

The levers, regardless of the dimensions of the platform, can be made of any desired length within a range restricted only by the properties of the material used. As a result, either the precision of the balance can be increased, or the expenditure of providing adjustment means or obtaining a high degree of precision, with the bearing spacings being maintained, can be reduced.

The invention also results in greater structural freedom in the configuration of the lever mechanism and the arrangement thereof relative to the platform dimensions. For example, even in the case of non-square platform, it is now possible for the levers to be extended outwardly longitudinally or transversely relative to the longitudinal direction of the platform.

Intermediate or transmission levers which were previously necessary, and corresponding connecting members or intermediate bearings, are no longer required, although in cases in which a substantial stepping-down in the transmission of the load being weighed to the transducer is desired, it may be desirable for one or more transmission levers to be arranged between the load levers and the transducer, as shown in FIG. 3.

While in accordance with the provisions of the Patent Statutes the preferred form and embodiments of the invention have been illustrated and described, various modifications may be made without deviating from the inventive concepts set forth herein.

What is claimed is:

1. Weighing apparatus of the platform scale type, comprising
   a. a frame (F);
   b. load lever means comprising a pair of generally horizontal load levers (8, 9) of unequal length, said load levers being arranged with first ends (12, 13) thereof adjacent each other;
   c. first connecting means (10) pivotally connecting first portions of each of said load levers remote from said first ends with said frame for pivotal movement about pivot axes normal to the longitudinal axes of said load levers, respectively;
   d. weighing means (18) connected with said frame, said weighing means including a transducer having a short operating stroke;
   e. second connecting means (14, 15, 16) connecting said load lever first ends directly with the transducer of said weighing means;
   f. a platform (5); and
   g. third connecting means (6) connecting said platform with second portions of each of said load levers remote from said first lever ends and spaced from said first portions, the ratio of the distance between said first and third connecting means and the distance between said second and third connecting means being the same for each of said load levers.

2. Apparatus as defined in claim 1, wherein said levers are parallel and are arranged on the same side relative to said weighing means.

3. Apparatus as defined in claim 1, wherein said transducer means comprises an electromechanical transducer.

4. Apparatus as defined in claim 1, wherein the ratio of the distance between the first and third connecting means to the distance between the second and third connecting means for each lever is 1:9.

5. Apparatus as defined in claim 1, wherein said second connecting means include a generally C-shaped connecting member (16) for applying the downward load force of said other lever ends to the transducer means of said weighing means.

6. Apparatus as defined in claim 1, wherein said second connecting means include knife-edge carriers (14, 14') connected with said first ends of said load levers, respectively, said knife edges being contained in a common horizontal line that extends parallel with the load lever pivot axes defined by said first connecting means, respectively.

7. Apparatus as defined in claim 6, wherein each of said load levers is bifurcated at the end thereof remote from said first end to define a pair of arm portions, said first connecting means comprising a plurality of knife-edge bearing means pivotally connecting the bifurcated arm portions of said load levers with said frame, respectively, the knife-edge bearing means associated with each lever lying in a common horizontal line.

8. Apparatus as defined in claim 7, wherein said third connecting means (6) comprise a plurality of knife-edge bearing means for connecting said bridge means with each of said bifurcated arm portions of said load levers, respectively, the knife-edge bearing means associated with each of the load levers being contained in a common horizontal line parallel with the load lever pivot axes.

9. Weighing apparatus of the platform scale type, comprising
   a. a frame (F);
   b. load lever means comprising a pair of generally horizontal load levers (8, 9) of unequal length, said load levers being arranged with first ends (12, 13) thereof adjacent each other;
   c. first connecting means (10) pivotally connecting first portions of each of said load levers remote from said first ends with said frame for pivotal movement about pivot axes normal to the longitudinal axes of said load levers, respectively;
   d. weighing means (18) connected with said frame, said weighing means including a transducer having a short operating stroke;
   e. second connecting means connecting said load lever first ends with the transducer of said weighing means, said second connecting means comprising a linkage assembly including a plurality of links (19, 20) connected to provide an increased weighing capacity;

f. a platform (5); and
g. third connecting means (6) connecting said platform with second portions of each of said load levers remote from said first lever ends and spaced from said first portions, the ratio of the distance between said first and third connecting means and the distance between said second and third connecting means being the same for each of said load levers.

* * * * *